United States Patent [19]

Abo et al.

[11] Patent Number: 5,046,009
[45] Date of Patent: Sep. 3, 1991

[54] SLIP SUPPRESSIVE DRIVE CONTROL SYSTEM FOR AUTOMOTIVE VEHICLE WITH REDUCTION OF POWER OUTPUT OF INTERNAL COMBUSTION ENGINE

[75] Inventors: Toshimi Abo; Takeshi Fujishiro; Katsunori Oshiage, all of Kanagawa, Japan

[73] Assignee: Nissan Motor Company, Limited, Yokohama, Japan

[21] Appl. No.: 266,759

[22] Filed: Nov. 3, 1988

[30] Foreign Application Priority Data

| Nov. 5, 1987 | [JP] | Japan | 62-280170 |
| Nov. 5, 1987 | [JP] | Japan | 62-280171 |
| Nov. 24, 1987 | [JP] | Japan | 62-294157 |

[51] Int. Cl.$^5$ .................................... B60K 31/00
[52] U.S. Cl. .................. 364/426.02; 362/424.1; 180/197; 123/333
[58] Field of Search ........... 364/424.1, 426.01, 426.03, 364/431.03, 431.05, 431.07, 426.02; 123/332, 333, 340, 325, 352; 180/197; 303/94, 95, 102, 103

[56] References Cited

U.S. PATENT DOCUMENTS

| 4,309,759 | 1/1982 | Tokuda et al. | 364/431.05 |
| 4,432,430 | 2/1984 | Lind et al. | 123/333 |
| 4,535,744 | 8/1985 | Matsumura | 123/325 |
| 4,558,672 | 12/1985 | Boccadoro et al. | 123/325 |
| 4,572,126 | 2/1986 | Arnold et al. | 123/325 |
| 4,597,308 | 7/1986 | Tanaka et al. | 74/866 |
| 4,603,668 | 8/1986 | Ueno | 123/352 |
| 4,638,781 | 1/1987 | Shiki et al. | 123/333 |
| 4,682,667 | 7/1987 | Hosaka | 123/333 |
| 4,694,796 | 9/1987 | Mori | 123/325 |
| 4,721,176 | 1/1988 | Kabasin et al. | 123/333 |
| 4,768,608 | 9/1988 | Hrovat | 364/426.02 |
| 4,821,606 | 4/1989 | Leiber | 180/197 |
| 4,860,849 | 8/1989 | Andersson et al. | 123/333 |
| 4,873,639 | 10/1989 | Sato et al. | 364/426.03 |

FOREIGN PATENT DOCUMENTS 0060339 5/1977 Japan ................. 123/333

*Primary Examiner*—Parshotam S. Lall
*Assistant Examiner*—Michael Zanelli
*Attorney, Agent, or Firm*—Foley & Lardner

[57] ABSTRACT

A slip suppressive drive control system derives an optimal wheel slippage for slip control mode operation on the basis of an actual engine speed, a vehicle speed and the wheel speed of a driving wheel. A target engine speed is derived based on the derived optimal wheel slippage so that optimal wheel slippage is obtained at the target engine speed. The system is responsive to wheel slippage which is derived on the basis of the vehicle speed and wheel speed on the driving wheel, to perform slip control mode operation by performing fuel cut-off to shut down fuel supply for the engine in order to adjust the actual engine speed to the target engine speed.

46 Claims, 12 Drawing Sheets

SLIP SUPPRESSIVE DRIVE CONTROL SYSTEM FOR AUTOMOTIVE VEHICLE WITH REDUCTION OF POWER OUTPUT OF INTERNAL COMBUSTION ENGINE

BACKGROUND OF THE INVENTION

1. Field of INVENTION

The present invention relates generally to a control system for adjusting driving torque to be exerted on an automotive driving wheel for preventing the latter from causing wheel slip which is otherwise caused due to loss of road traction. More specifically, the invention relates to a slip suppressive drive control system which can reduce power output of an automotive internal combustion engine in response to excessive wheel slippage for recovery of road traction of wheel.

2. Description of the Background Art

One typical construction of a slip control system for adjusting driving torque to be applied to a road wheel, has been disclosed in Japanese Patent First (unexamined) Publication (Tokkai) Showa 58-38347. The disclosed slip control system derives a wheel slippage on the basis of difference of rotation speed of driving and driven wheels. The slip control system performs fuel cut-off for reducing engine output when wheel slippage is detected.

In such type of slip control, hunting in slip control fuel cut-off mode and normal fuel supply mode tends to be caused in certain vehicle driving conditions. Namely, when wheel slippage is caused, fuel cut-off mode operation is performed. The fuel supply system is maintained in a fuel cut-off mode while wheel slippage is greater than a predetermined wheel slippage threshold. As soon as wheel slippage drops below the wheel slippage threshold, the fuel supply system is switched into a fuel supply mode. By this engine output is instantly resumed to exert driving torque on the road wheel. This again causes wheel slippage greater than the wheel slippage threshold. By repeating fuel cut-off and fuel resumption, jerking of a vehicular body is caused to degrade vehicle riding comfort.

On the other hand, Japanese Patent First Publication (Tokkai) Showa 58-202142 discloses another type slip control system, in which a brake is applied to decelerate the road wheel in response to wheel slippage. In such system, a pressurized medium, such as pressurized brake fluid, is required to be constantly supplied. For this purpose, the system is required to have a pressure medium source which is maintained in operation while the vehicle is driven. This clearly increase the cost for facilitating the system.

Japanese Patent First Publication (Tokkai) Showa 59-18251 discloses a still another type of slip control system, in which a throttle valve angular position is adjusted for adjusting driving torque to be exerted on the road wheel. In this system, the throttle open angle is reduced in response to the wheel slippage for reducing engine load and thereby reducing the engine output. In order to achieve satisfactorily quick response in response to the wheel slippage, it is required to have a precise and high response actuator in place of the conventional mechanical linkage system, for achieving quick response in adjustment of the throttle valve angular position. This clearly causes a high cost.

Because of the defects set forth above, the prior proposed slip control systems are not satisfactory for successfully adjusting the driving torque to be exerted on the road wheel.

SUMMARY OF THE INVENTION

Therefore, it is an object of the present invention to provide a slip suppressive drive control system which can solve the problems in the prior art without causing a substantial cost increase.

Another object of the present invention is to provide a slip suppressive drive control system, in which fuel cut-off is performed for adjusting engine output torque but successfully preventing the system from causing hunting in switching operation mode between fuel cut-off mode and fuel supply mode.

A further object of the present invention is to provide a slip suppressive drive control system which can prevent a catalytic converter in an engine exhaust system from being damaged due to excessively high exhaust temperature which can be caused due to cutting-off the fuel supply.

A still further object of the present invention is to provide a slip suppressive drive control system, in which the system controls not only the engine but also a power transmission so as to adapt the transmission gear position to the engine driving condition.

In order to accomplish the aforementioned and other objects, a slip suppressive drive control system, according to the present invention, derives an optimal wheel slippage for slip control mode operation on the basis of an actual engine speed, a vehicle speed and the wheel speed of a driving wheel. A target engine speed is derived based on the derived optimal wheel slippage so that optimal wheel slippage is obtained at the target engine speed. The system is responsive to wheel slippage which is derived on the basis of the vehicle speed and wheel speed on the driving wheel, to perform slip control mode operation by performing fuel cut-off to shut down fuel supply for the engine in order to adjust the actual engine speed to the target engine speed.

By this process, slip control can be effectively performed to maintain the wheel slippage at the optimal wheel slippage level. This prevents the system from causing hunting in switching operation mode between slip control mode and normal mode.

The object of the invention may further achieved by monitoring an exhaust temperature at a catalytic converter and adjusting duty cycle in repeating fuel cut-off and fuel supply for maintaining the exhaust temperature lower than a critical temperature of the catalytic converter.

A further object of the invention may be achieved by inhibiting shifting operation of a power transmission. This prevents the power transmission from causing variation of the gear ratio and thereby achieves quicker deceleration of the engine for effectively adjusting the engine speed toward the target engine speed.

According to one aspect of the invention, a slip control system for an automotive vehicle, comprises:

first sensor means for monitoring an engine revolution speed to produce an engine speed indicative data;

second sensor means for monitoring rotation speed of a driving wheel which is driven by an output of an automotive internal combustion engine, and producing driving wheel speed representative data;

third sensor means for monitoring vehicle speed to produce vehicle speed representative data;

fourth means for detecting wheel slippage greater than a predetermined wheel slippage threshold on the basis of the driving wheel speed representative data and the vehicle speed representative data; and fifth means for controlling an engine revolution speed based on preselected engine control parameters, the fifth means being responsive to the fourth means detecting the driving wheel speed representative data and the vehicle speed representative data for initiating a slip control mode operation in which a target engine speed achieving a predetermined allowable wheel slippage is derived on the basis of the engine speed data, the driving wheel speed representative data and the vehicle speed representative data and the engine speed is controlled toward the target engine speed.

According to another aspect of the invention, a slip control system for an automotive vehicle, comprises:

first sensor means for monitoring an engine revolution speed to produce engine speed indicative data;

second sensor means for monitoring rotation speed of a driving wheel which is driven by an output of an automotive internal combustion engine, and producing driving wheel speed representative data;

third sensor means for monitoring vehicle speed to produce vehicle speed representative data;

fourth sensor means for monitoring catalytic converter temperature to produce catalytic converter temperature representative data;

fifth means for detecting wheel slippage greater than a predetermined wheel slippage threshold on the basis of the driving wheel representative data and the vehicle speed representative data; and sixth means for controlling an engine revolution speed based on preselected engine control parameters, the fifth means being responsive to the fourth means detecting the driving wheel speed representative data and the vehicle speed representative data for initiating a slip control mode operation in which the fifth means periodically performs fuel cut-off in slip control mode operation for adjusting the engine speed to the target engine speed, the sixth means adjusting a fuel cut period in which fuel cut-off is performed, depending upon the catalytic converter representative data.

According to a further aspect of the invention, a slip control system for an automotive vehicle, comprises:

first sensor means for monitoring an engine revolution speed to produce engine speed indicative data;

second sensor means for monitoring rotation speed of a driving wheel which is driven by an output of an automotive internal combustion engine, and producing driving wheel speed representative data;

third sensor means for monitoring vehicle speed to produce vehicle speed representative data;

fourth means for detecting wheel slippage greater than a predetermined wheel slippage threshold on the basis of the driving wheel speed representative data and the vehicle speed representative data;

fifth means for controlling an engine revolution speed based on preselected engine control parameters, the fifth means being responsive to the fourth means detecting the driving wheel speed representative data and the vehicle speed representative data for initiating a slip control mode operation in which a target engine speed achieving a predetermined allowable wheel slippage is derived on the basis of the engine speed data, the driving wheel speed representative data and the vehicle speed representative data and the engine speed is controlled toward he target engine speed and sixth means for controlling gear shifting of a power transmission, the sixth means is responsive to the fifth means operating in the slip control mode to fix gear position at a gear ratio at which wheel slippage greater than the wheel slippage threshold is detected.

According to a still further aspect of the invention, a slip control system for an automotive vehicle, comprises:

first sensor means for monitoring an engine revolution speed to produce engine speed indicative data;

second sensor means for monitoring rotation speed of a driving wheel which is driven by an output of an automotive internal combustion engine, and producing driving wheel speed representative data;

third sensor means for monitoring vehicle speed to produce vehicle speed representative data;

fourth means for detecting wheel slippage greater than a predetermined wheel slippage threshold on the basis of the driving wheel speed representative data and the vehicle speed representative data;

fifth means for controlling an engine revolution speed based on preselected engine control parameters, the fifth means being responsive to the fourth means detecting the driving wheel speed representative data and the vehicle speed representative data for initiating a slip control mode operation in which a target engine speed achieving a predetermined allowable wheel slippage is derived on the basis of the engine speed data, the driving wheel speed representative data and the vehicle speed representative data and the engine speed is controlled toward he target engine speed; and sixth means for controlling gear shifting of a power transmission, the sixth means is responsive to the fifth means operating in the slip control mode to cause delay in gear shifting from a gear ratio at which wheel slippage greater than the wheel slippage threshold is detected to a desired gear ratio determined based on preselected transmission control parameters.

According to a yet further aspect of the invention, a slip control system for an automotive vehicle, comprises:

first sensor means for monitoring an engine revolution speed to produce engine speed indicative data;

second sensor means for monitoring rotation speed of a driving wheel which is driven by an output of an automotive internal combustion engine, and producing driving wheel speed representative data;

third sensor means for monitoring vehicle speed to S produce vehicle speed representative data;

fourth means for detecting wheel slippage greater than a predetermined wheel slippage threshold on the basis of the driving wheel speed representative data and the vehicle speed representative data;

fifth means for controlling engine operation, which is responsive to the fourth means detecting wheel slippage greater than the wheel slippage threshold to adjust the engine operation for adjusting the engine output; and sixth means for controlling gear shifting of a power transmission, the sixth means is responsive to the fifth means operating in the slip control mode to fix gear position at a gear ratio at which wheel slippage greater than the wheel slippage threshold is detected.

According to a still further aspect of the invention, a slip control system for an automotive vehicle, comprises:

first sensor means for monitoring an engine revolution speed to produce an engine speed indicative data;

second sensor means for monitoring rotation speed of a driving wheel which is driven by an output of an automotive internal combustion engine, and producing driving wheel speed representative data;

third sensor means for monitoring vehicle speed to produce vehicle speed representative data;

fourth means for detecting wheel slippage greater than a predetermined wheel slippage threshold on the basis of the driving wheel speed representative data and the vehicle speed representative data;

fifth means for controlling engine operation, which is responsive to the fourth means detecting wheel slippage greater than the wheel slippage threshold to adjust the engine operation for adjusting the engine output; and sixth means for controlling gear shifting of a power transmission, the sixth means is responsive to the fifth means operating in the slip control mode to cause delay in gear shifting from a gear ratio at which wheel slippage greater than the wheel slippage threshold is detected to a desired gear ratio determined based on preselected transmission control parameters.

DESCRIPTION OF THE PREFERRED EMBODIMENT

Figure 1:
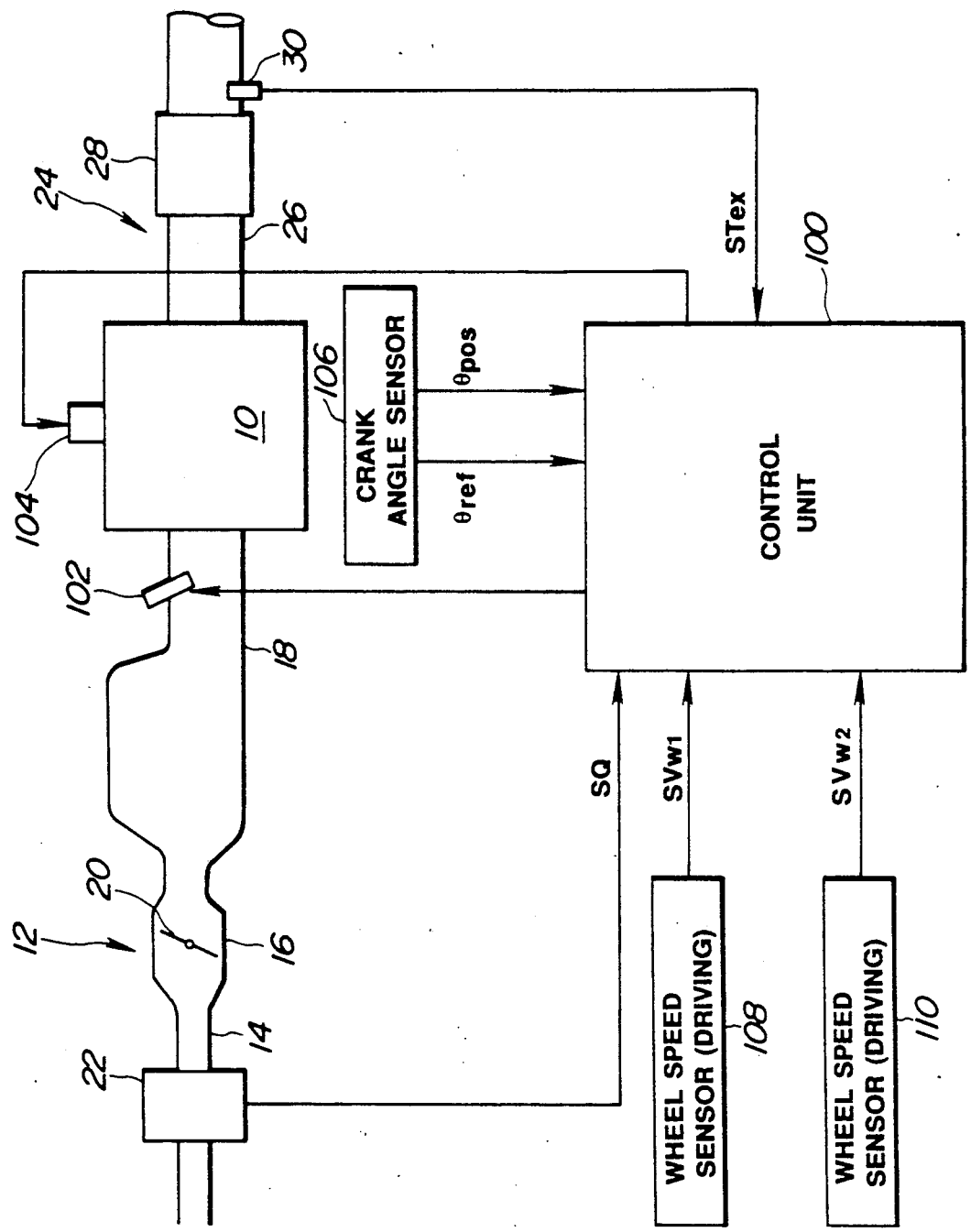
FIG. 1 is a schematic block diagram of the first embodiment of slip suppressive drive control system, according to the present invention.

Referring now to the drawings, particularly to FIG. 1, the first embodiment of a slip suppressive drive control system, according to the present invention, is applied to a fuel injection internal combustion engine. As is well known, the engine 10 is associated with an induction system 12 which includes an induction pipe 14, a throttle chamber 16 and an intake manifold 18. A throttle valve 20 is disposed in the throttle chamber 16 for adjusting an intake air path area and thereby adjusting intake air flow rate. The intake air flow rate as engine load representative data Q is monitored by an air flow meter 22. The air flow meter 22 produces an air flow rate indicative signal $S_Q$. The air flow meter 22 is connected to a control unit 100.

The engine 10 is also associated with an exhaust system 24 for exhausting an exhaust gas. The exhaust system 24 includes an exhaust pipe 26 and a catalytic converter 28. The catalytic converter 28 is provided for purification of exhaust gas for anti-pollution purposes. At a position downstream of the catalytic converter 28, a catalytic converter temperature sensor 30 is provided for monitoring exhaust gas temperature Tex to produce a catalytic converter temperature indicative signal $S_{Tex}$. The catalytic converter temperature sensor 30 is connected to the control unit 100 to input the catalytic converter temperature indicative signal $S_{Tex}$.

Figure 2:
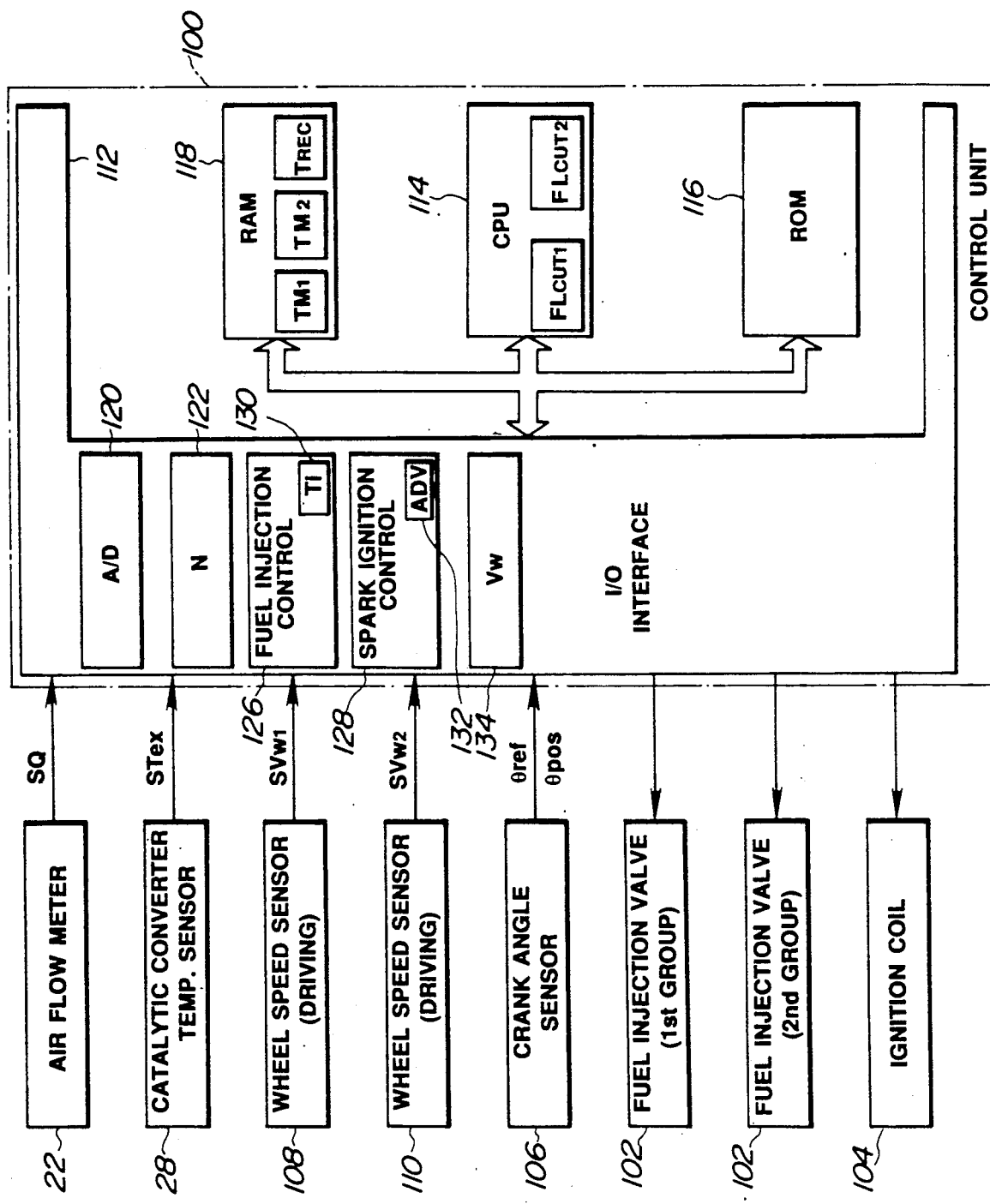
FIG. 2 is a block diagram of a circuitry of the first embodiment of the slip control system of FIG. 1.

As shown in FIGS. 1 and 2, the control unit 100 is also connected to fuel injection valves 102 disposed within the intake manifold 18 for injecting a controlled amount of fuel at a controlled timing. The control unit 100 is also connected to an ignition coil 104 for triggering the latter at a controlled timing derived in synchronism with the engine revolution cycle. The control unit 10( derives a fuel injection control signal and a spark ignition control signal for controlling operation of the fuel injection valves 102 and the ignition coil 104. In order to derive the fuel injection control signal and the spark ignition control signal, the control unit 100 is connected to a crank angle sensor 106. As is well known, the crank angle sensor 106 monitors the engine revolution cycle to produce a crank reference signal $\theta_{ref}$ at every predetermined engine revolution cycle position, e.g. 70° before top-dead-center (BTDC) of each engine cylinder, and a crank position signal $\theta_{pos}$ at every given angle. e.g. 2° of angular displacement of the engine revolution cycle.

The control unit 100 is further connected to a first wheel speed sensor 108 which monitors rotation speed $Vw_1$ of a driving wheel to produce a driving wheel speed indicative signal $S_{Vw1}$ and a second wheel speed sensor 110 which monitors rotation speed $Vw_2$ of a driven wheel to produce a driven wheel speed indicative signal $S_{Vw2}$. The control unit 100 derives wheel slippage $\lambda$ on the basis of the driving wheel and driven wheel speed indicative signal values $Vw_1$ and $Vw_2$. The control unit 100 performs slip suppressive drive control so as to maintain wheel slippage $\lambda$ at a value smaller than a predetermined wheel slippage threshold $\lambda_{ref}$.

As shown in FIG. 2, the control unit 100 comprises an input/output interface 112, CPU 114, ROF 116 and RAM 118. An analog-to-digital (A/D) converter 120 is provided in the input/output interface 112 for converting the intake air flow rate indicative signal $S_Q$ and the catalytic converter temperature indicative signal $S_{Tex}$ which are input in forms of analog signals, into digital signals. The input/output interface 112 is also provided with an engine speed deriving section 122 which derives engine speed data N on the basis of frequency of occurrences of the crank reference signal $\theta_{ref}$ or the crank position signal $\theta_{pos}$.

As is well known, the engine speed data N can be derived by calculating, a reciprocal of an interval of occurrences of crank reference signal $\theta_{ref}$, by counting the crank position signal $\theta_{pos}$ for a given period or by measuring a period for given number of crank position signals $\theta_{pos}$.

The input/output interface 112 is further provided with a fuel injection control section 126 and a spark ignition control section 128. The fuel injection control section 126 includes a Ti register 130, to which fuel injection amount data Ti is set for controlling fuel injection amount and fuel injection timing. On the other hand, the spark ignition control section 128 includes a ADV register 132, to which spark ignition timing data ADV is set for controlling spark ignition timing.

The input/output interface 112 further includes a wheel speed derivation section 134 which receives the driving wheel speed indicative signal $S_{Vw1}$ and the driven wheel speed indicative signal $S_{Vw2}$ in a form of pulse signals and derives driving wheel speed data $Vw_1$ and drive wheel speed data $Vw_2$.

Further detail of the slip suppressive drive control system will be discussed herebelow with a slip suppressive fuel supply control process which will be described in detail with reference to FIGS. 3 to 6.

In brief, during the control operation the control unit 100 derives the wheel slippage The control unit 100 performs slip control mode fuel injection control when the wheel slippage $\lambda$ becomes greater than the wheel slippage threshold $\lambda_{ref}$. In the slip control mode operation, a target engine speed $N_{cut}$ is derived on the basis of the engine speed data N, the driving wheel speed data $Vw_1$ and the driven wheel speed data $V_{w2}$, so that an optimal wheel slippage $\lambda$ opt can be obtained. In the slip control mode opera ion, fuel cut-off is cyclically performed at a predetermined frequency for decelerating the engine toward the target engine speed $N_{cut}$.

In practice, fuel cut-off in the slip control mode is performed in two modes, i.e. partial cut-off mode in which fuel cut-off is performed for one of two groups of fuel injection valves 102, and a full cut-off node in which fuel cut-off is performed for both groups of fuel injection valves 102. In either case, fuel-cut and fuel resumption are performed alternatively and cyclically. The ratio of a period, in which fuel is cut-off and which is thus hereafter referred to as the fuel cut period and a period, in which fuel is supplied and which will be hereafter referred to as the fuel supply period is variable depending upon catalytic converter temperature $T_{ex}$ as monitored by the catalytic converter temperature sensor 30.

Figure 3:
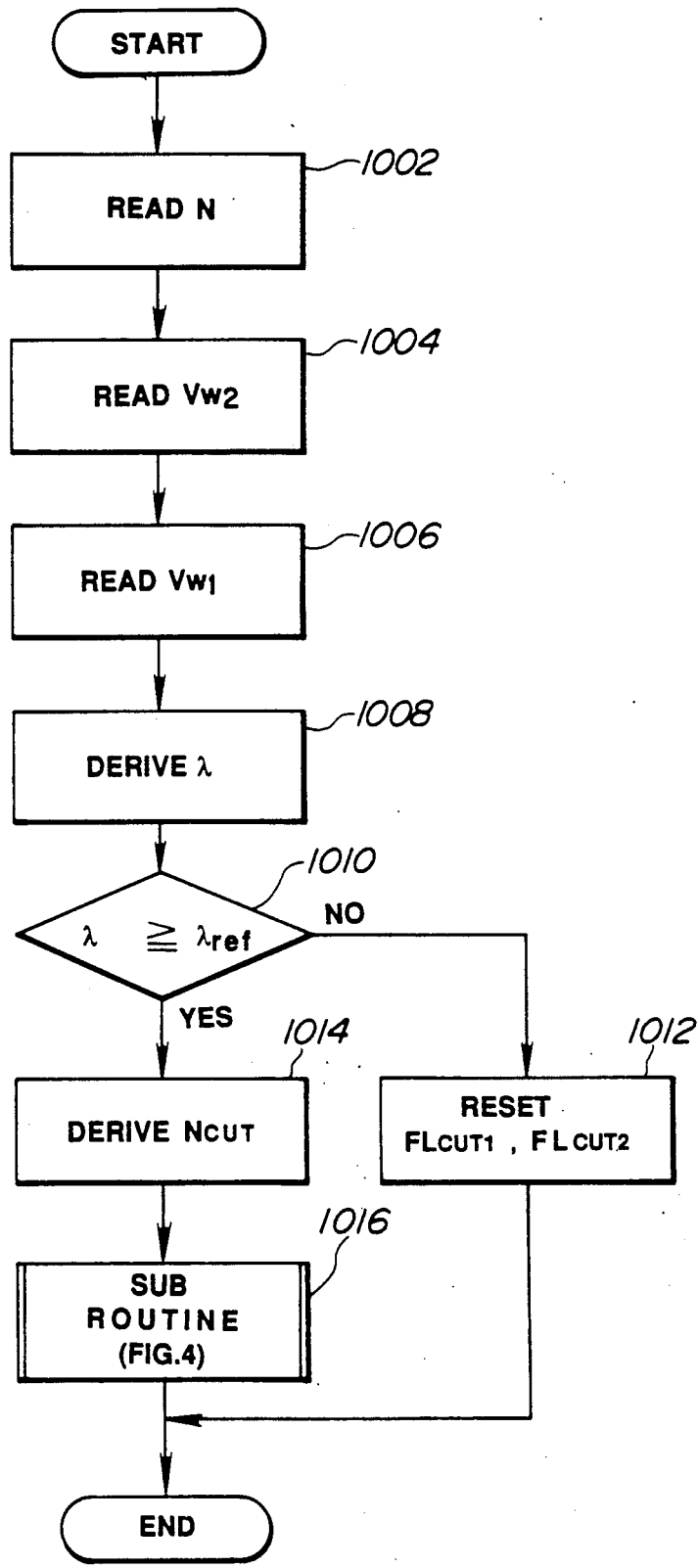
FIG. 3 is a flowchart of a main routine of slip suppressive drive control.

The fuel injection control process will be discussed herebelow with reference to FIG. 3. The main routine shown in FIG. 3 is executed periodically at a predetermined timing. Immediately after starting execution, the engine speed data N is read out at a step 1002. Then, at a step 1004, the driven wheel speed data $V_{w2}$ is read from the wheel speed deriving section 134 of the input/output interface 112. At a step 1006, the driving wheel speed data $V_{w1}$ is read from the wheel speed deriving section 134.

Since the driven wheel is driven through the vehicle body which is driven by the driving wheel, the driven wheel speed generally corresponds to the vehicular speed. Therefore, the driven wheel speed is taken as the vehicle speed representative data.

Based on the driven wheel speed data $Vw_2$ and the driving wheel speed data $Vw_1$ read at the steps 1004 and 1006 wheel slippage $\lambda$ is derived at a step 1008. In practice, the wheel slippage $\lambda$ is derived from the following equation:

$$\lambda + (Vw_2 - Vw_1)/Vw_1$$

The wheel slippage $\lambda$ derived at the step 1008 is compared with the wheel slippage threshold $\lambda_{ref}$ at a step 1010. When the wheel slippage $\lambda$ is smaller than the wheel slippage threshold $\lambda_{ref}$, then fuel injection control is performed in a normal control mode. When the normal control mode is ordered, fuel cut-off mode indicative flags $FL_{cut1}$ and $FL_{cut2}$ are reset at a step 1012. After resetting the fuel cut-off mode indicative flags $FL_{cut1}$ and $FL_{cut2}$ process goes to END.

On the other hand, if the wheel slippage $\lambda$ is equal to or greater than the wheel slippage threshold, as checked at the step 1010, the target engine speed $N_{cut}$ is derived on the basis of the engine speed data N, the driving wheel speed data $Vw_1$ and the driven wheel speed data $Vw_2$, at a step 1014. When the power transmission cf the vehicle is a manual transmission, the target engine speed $N_{cut}$ can be calculated by the following equation:

$$N_{cut} = N \times Vw_2/Vw_1 \times 1.2$$

From the foregoing equation, the target engine speed $N_{cut}$ corresponds the wheel slippage of 20%. Therefore, in this case, predetermined optimal wheel slippage $\lambda_{opt}$ becomes 20%. Although the embodiment shown is set at the optimal wheel slippage $\lambda_{opt}$ of 20%, the optimal wheel slippage may be set any value.

Figure 4:
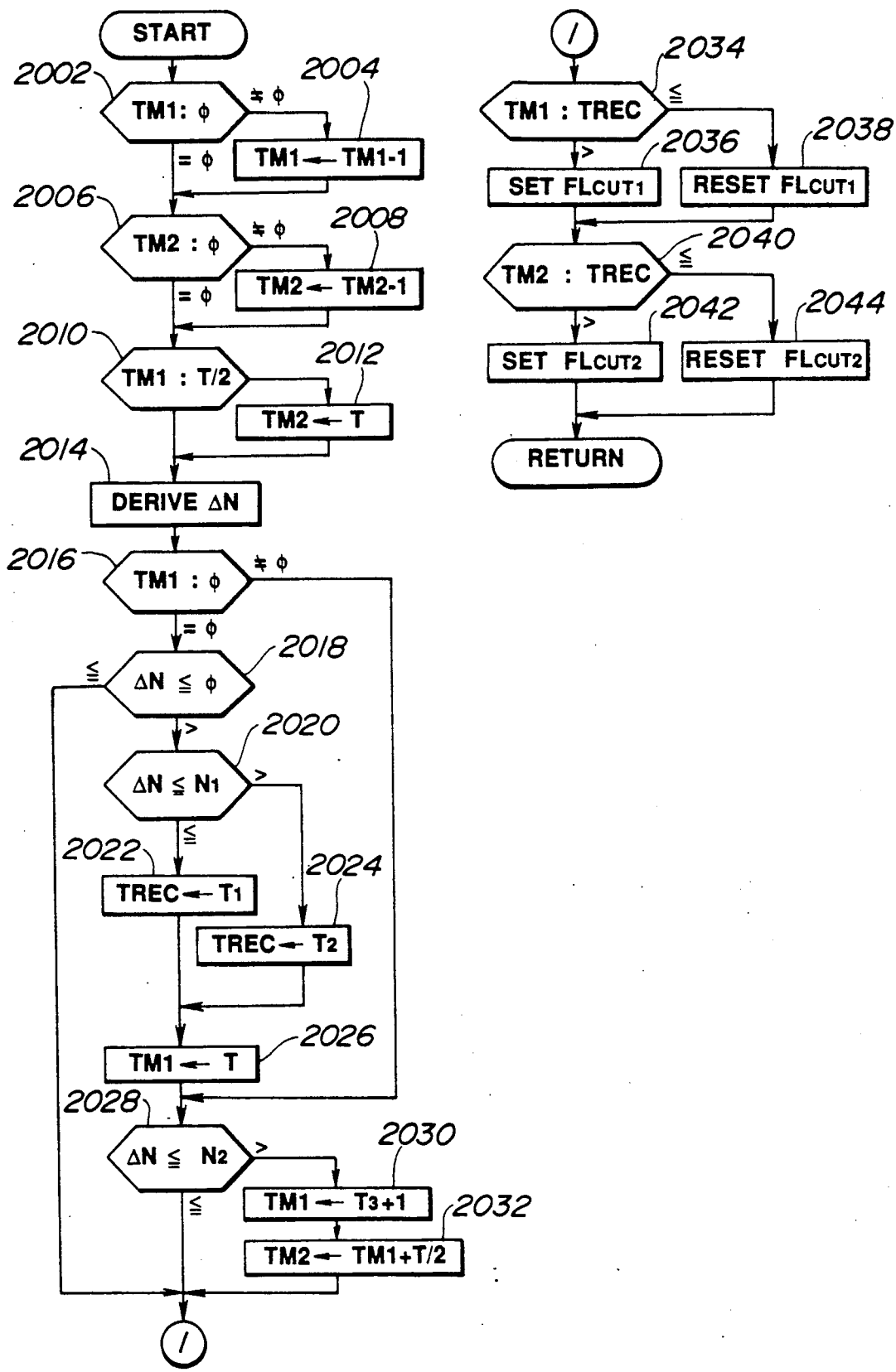
FIG. 4 is a flowchart of a sub-routine which is triggered in the slip suppressive drive control main routine of FIG. 3, which sub-routine governs fuel cut-off operation in slip control mode operation.

After deriving the target engine speed $N_{cut}$ at the step 1014, sub-routine of FIG. 4 is triggered at a step 1016.

Immediately after triggering the sub-routine of FIG. 4, a fuel cut timer value $TM_1$ of a fuel cut timer 140 in RAM 118 is checked at a step 2002. The fuel cut timer 140 is set at a value representative of a fuel cut-off period for a first group of fuel injection valves 102. Therefore, the fuel is cut-off for a predetermined fuel cut-off period for the first group of the fuel injection valves 102 corresponding to an initial value set for the fuel cut time; value $TM_1$. When the fuel cut timer value $TM_1$ is not zero as checked at the step 2002, the fuel cut timer value $TM_1$ is decremented by 1, at a step 2004.

When the fuel cut timer value $TM_1$ is zero as checked at the step 2002 or after decrementing the fuel cut timer value $TM_1$ at the step 2004, a fuel cut timer value $TM_2$ of a fuel cut timer 142 in RAM 118, is checked at a step 2006. The initial value set in the fuel cut timer 142 represents the fuel cut-off period for the second group of fuel injection valves 102. If the fuel cut timer value $TM_2$ is not zero as checked at the step 2006, the fuel cut timer value $TM_2$ is decremented by 1, at a step 2008.

Figure 7:
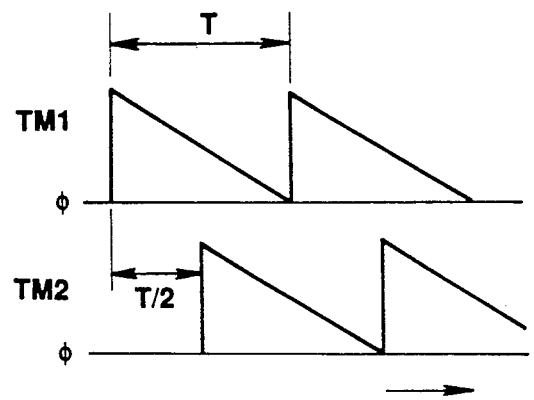
FIG. 7 is a timing chart showing variation of a fuel injection counter in fuel cut-off control.

Through the sets 2002 to 2008, the fuel cut timer values $TM_1$ and $TM_2$ are decremented to zero from the initial value over fuel cut cycles, as shown in FIG. 7.

When the fuel cut timer value $TM_2$ as checked at the step 2006 is zero or after decrementing the fuel cut timer value $TM_2$ at the step 2008, the fuel cut timer value $TM_1$ is checked whether it is equal to half of a set fuel cut cycle period T at a step 2010. As seen from FIG. 10, the fuel cut cycle period T includes a fuel cut period and a fuel supply period in each fuel cut-off cycle. If the fuel cut timer value $TM_1$ is equal to T/2 as checked at a step 2010, the fuel cut timer value $TM_2$ of the fuel cut timer 142 is set at the set fuel cut-off cycle period T, at a step 1012. If the fuel cut timer value $TM_1$ as checked at the step 2010 or after setting the fuel cut timer value $TM_2$ is set at a value T, a difference $\Delta N$ between the engine speed data N and the target engine speed $N_{cut}$ is calculated at a step 2014. Then, the fuel cut timer value $TM_1$ is again checker at a step 2016. When the fuel cut timer value $TM_1$ as checked at the step 2016 is not zero, the difference $\Delta N$ derived at the step 2014 is checked at a step 2018. If the difference $\Delta N$ is greater than zero, which means that the engine speed N s higher than the target engine speed $N_{cut}$, as checked at the step 2018, the difference $\Delta N$ is compared with a predetermined engine speed difference criterion $N_1$ at a step 2020.

Figure 9:
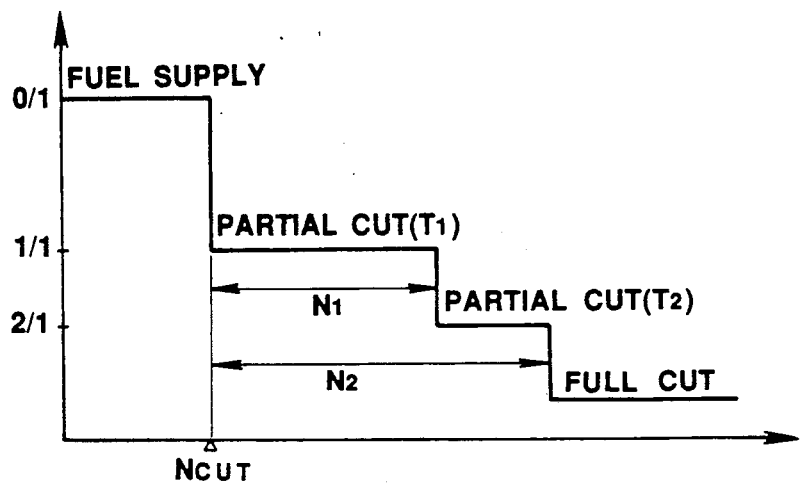
FIG. 9 is a chart showing a time ratio of a fuel cut-off period and fuel supply period in relation to engine speed.
Figure 10:
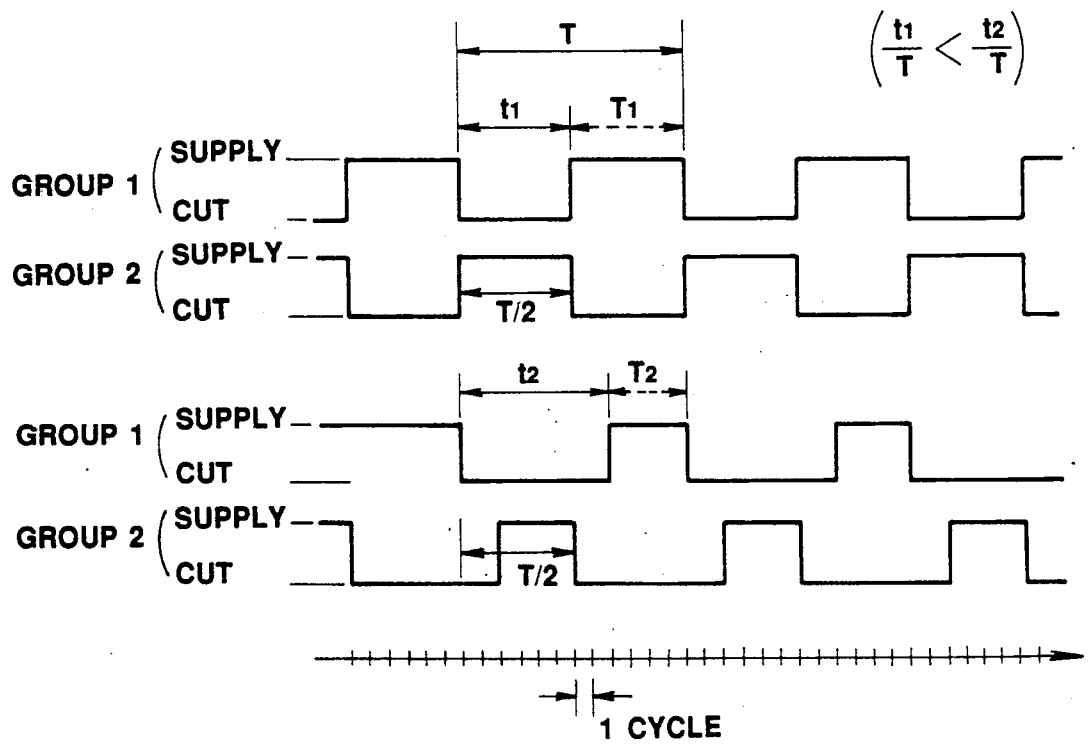
FIG. 10 is a time chart showing a fuel cut-off timer ratio in catalytic converter temperature dependent fuel cut-off control.

As seen from FIG. 9, the engine speed difference criterion $N_1$ is set at a value to discriminate the engine speed condition requiring a long or short fuel cut period in the fuel cut-off cycle period. Namely, as shown in FIGS. 9 and 10, the fuel cut period is set at a period $T_1$ which is equal to a fuel supply period $t_1$ in the fuel cut-off cycle period T when the difference $\Delta N$ is smaller than or equal to the engine speed difference criterion $N_1$. On the other hand, when the difference $\Delta N$ is greater than the engine speed difference criterion $N_1$, the fuel cut period is set at $T_2$ which is shorter than the period $T_1$. When the fuel cut period is set at $T_2$, the fuel supply period is expanded to $t_2$. The fuel cut period $T_1$ will be hereafter referred to as an "even fuel cut period rate representative value". The fuel cut period $T_2$ will be hereafter referred to as a "shorter fuel cut period rate representative value".

When the difference AN as checked at the step 2020 is smaller than or equal to the engine speed difference criterion $N_1$, a fuel recovery timer value $T_{REC}$ of a fuel recovery timer 144 in RAM 118 is set at a predetermined value $T_1$, at a step 2022. The even fuel ut period rate representative value $T_1$ represents a fuel cut period in the fuel cut-off cycle period T. On the other hand, when the difference $\Delta N$ is greater than the engine speed difference criterion $N_1$ as checked at the step 2020, the fuel recovery timer value $T_{REC}$ is set at a shorter fuel cut period rate representative value $T_2$, at a step 2024. After setting the fuel recovery timer value $T_{REC}$ at the step 2022 or 2024, the fuel cut timer value $TM_1$ is set at the set fuel cut-off cycle period T, at a step 2026.

After setting the fuel cut timer value $TM_1$ to the fuel cut-off cycle period T at the step 2016, the difference $\Delta N$ is compared with a predetermined engine speed difference criterion $N_2$ which is set at a greater value than the engine speed difference criterion $N_2$ at a set 2028. As seen from FIG. 9, the engine speed difference criterion $N_2$ is greater than the engine speed difference criterion $N_1$, which criterion $N_2$ represents a criterion to discriminate the engine driving condition whether the engine driving condition is to perform partial fuel cut-off to shut down fuel supply for one of the two fuel injection value groups, or to perform full fuel cut-off to shut down fuel supply for both groups of fuel injection valves. As shown, in the partial fuel cut-off mode, fuel cut-off is performed alternatively in two groups of fuel injection valves. When the difference $\Delta N$ is greater than the engine speed difference criterion $N_2$ as checked at the step 2028, the fuel cut timer value $TM_1$ is set at a value $T_3$ which is greater than the fuel cut timer value $TM_2$ by 1, at a step 2030. Thereafter, the fuel cut timer value $TM_2$ is set at a value $T_4$ which is a sum value of the fuel cut timer value $TM_1$ and T/2, at a step 2032.

Then, the fuel cut timer value $TM_1$ is compared with the fuel recovery timer value $T_{REC}$ at a step 2034. When the fuel cut timer value $TM_1$ is greater than the fuel recovery timer value $T_{REC}$ as checked at the step 2(34, the fuel cut mode indicative flag $FL_{cut1}$ is set at a step 2036. By setting the fuel cut mode indicative flag $FL_{cut1}$, fuel cut-off operation for the first group of fuel injection valves 102 is ordered. On the other hand, when the fuel cut timer value $TM_1$ is smaller than or equal to the fuel recovery timer value $T_{REC}$ as checked at the step 2034, the fuel cut mode indicative flag $FL_{cut1}$ is reset at a step 2038. By resetting of the fuel cut mode indicative flag $FL_{cut1}$, fuel supply is ordered. Subsequently, the fuel cut timer value $TM_2$ is compared with the fuel recovery timer value $T_{REC}$ at a step 2040. When the fuel cut timer value $TM_2$ is greater than the fuel recovery timer value $T_{REC}$ as checked at the step 2040, the fuel cut mode indicative flag $FL_{cut2}$ is set at a step 2042. By setting the fuel cut mode indicative flag $FL_{cut2}$, fuel cut-off operation for the first group of fuel injection valves 102 is ordered. On the other hand, when the fuel cut timer value $TM_2$ is smaller than or equal to the fuel recovery timer value $T_{REC}$ as checked at the step 2040, the fuel cut mode indicative flag $FL_{cut2}$ is reset at a step 2044. By resetting of the fuel cut mode indicative flag $FL_{cut2}$, fuel supply is ordered. After one of the steps 2042 and 2044, the process returns to the main routine of FIG. 3.

On the other hand, when the fuel cut timer value $TM_1$ is not zero as checked at the step 2016, the process jumps to the step 2028. When the difference $\Delta N$ is smaller than or equal to zero as checked at the step 2018, the process jumps to the step 2034. Similarly, when the difference $\Delta N$ is smaller than or equal to the engine speed difference criterion $N_2$, the process also jumps to the step 2034.

Figure 8:
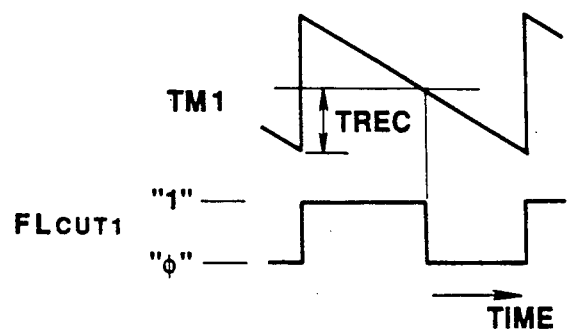
FIG. 8 is a timing chart showing switching timing of fuel cut-off and fuel supply.

As shown in FIG. 8, the fuel cut mode representative flags $FL_{cut1}$ and $FL_{cut2}$ are maintained at a set condition as long as the fuel cut timer values $TM_1$ and $TM_2$ are greater than the fuel recovery timer value $T_{REC}$. Therefore, through the steps 2034 to 2042, fuel cut and fuel supply are controlled.

Figure 5:
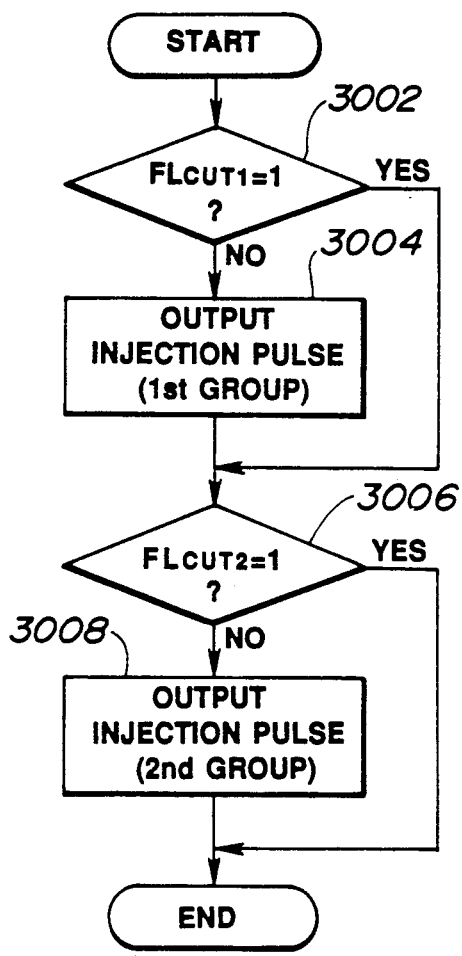
FIG. 5 is a flowchart of a routing for controlling fuel injection.

FIG. 5 shows routine for governing fuel injection as governed by the fuel cut mode representative flags $FL_{cut1}$ and $FL_{cut2}$.

Immediately after starting execution, the fuel cut mode representative flag $FL_{cut1}$ is checked at a step 3002. If the fuel cut mode representative flag $FL_{cut1}$ is not set as checked at the step 3002, fuel injection is enabled. Therefore, a fuel injection pulse is set for fuel injection through first group of the fuel injection valves 102, at a step 3004. After outputting the fuel injection pulse at the step 3004 or when the fuel cut mode representative flag $FL_{cut1}$ is set as checked at the step 3002, the fuel cut mode representative flag $FL_{cut2}$ is checked at a step 3006. If the fuel cut mode representative flag $FL_{cut2}$ is not set as checked at the step 3006, fuel injection is enabled. Therefore, a fuel injection pulse is set for fuel injection through first group of the fuel injection valves 102, at a step 3008. After outputting the fuel injection pulse at the step 3008 or when the fuel cut mode representative flag $FL_{cut2}$ is set as checked at the step 3006, the process goes to END.

Figure 6:
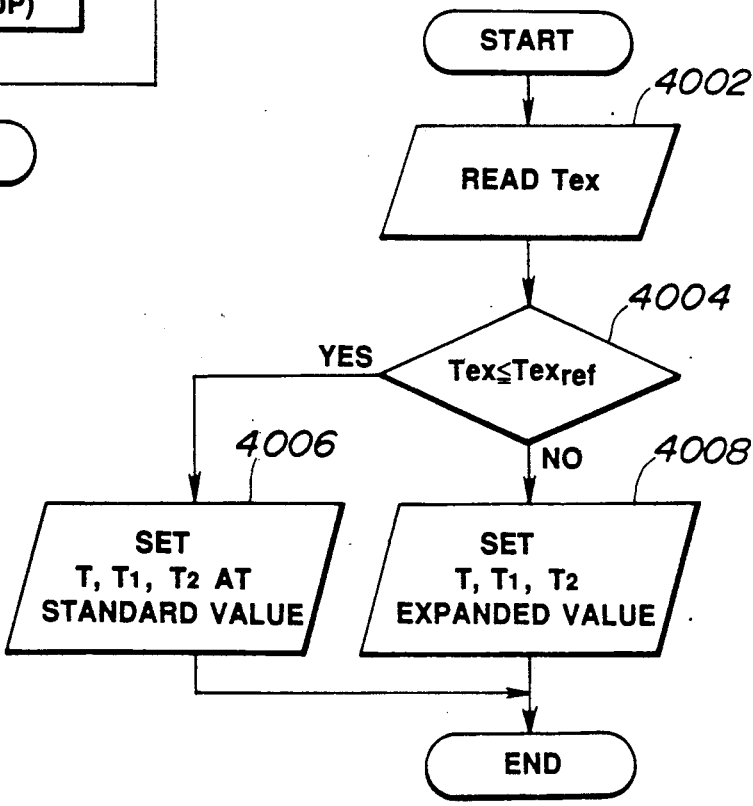
FIG. 6 is a flowchart of a routine for deriving a duty cycle of fuel cut-off operation in view of catalytic converter temperature.

FIG. 6 shows a routine for setting the fuel cut period depending upon the catalytic converter temperature monitored by the catalytic converter temperature sensor 30.

At a step 4002, the catalytic converter temperature data $T_{ex}$ is read out. The catalytic converter temperature data $T_{ex}$ is compared with a catalytic converter temperature threshold value $Tex_{ref}$, at a step 4004. When the catalytic converter temperature data $T_{ex}$ is smaller than or equal to the catalytic converter temperature threshold value $Tex_{ref}$ as checked at the step 4004, the fuel cut-off cycle period value T, the even fuel cut period rate indicative value $T_1$ and the shorter fuel cut period rate indicative value $T_2$ are set at predetermined standard values, at a step 40(6. On the other hand, when the catalytic converter temperature data $T_{ex}$ is greater than the catalytic converter temperature threshold value $Tex_{ref}$ as checked at the step 4004, the fuel cut-off cycle period value T, the even fuel cut period rate indicative value $T_1$ and the shorter fuel cut period rate indicative value $T_2$ are set at predetermined greater values, at a step 4008.

Figure 11:
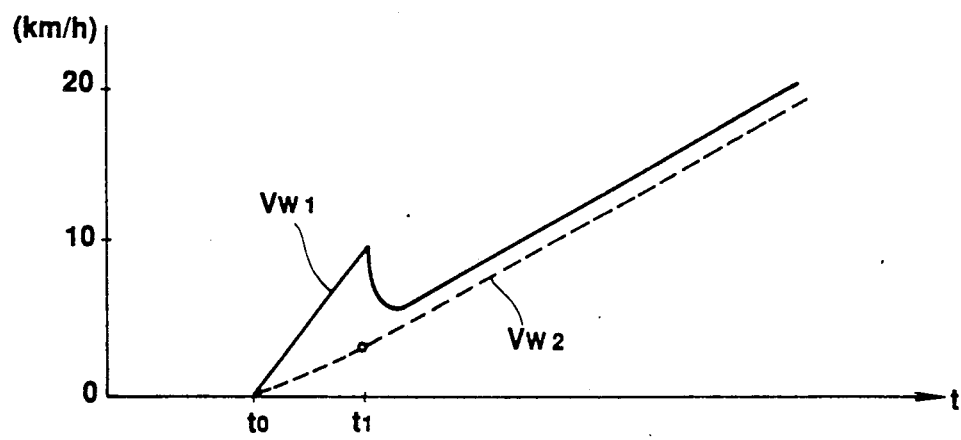
FIG. 11 is a chart showing variation of wheel speed, in which wheel speed variation upon wheel slippage occurs on a driving wheel.
Figure 12:
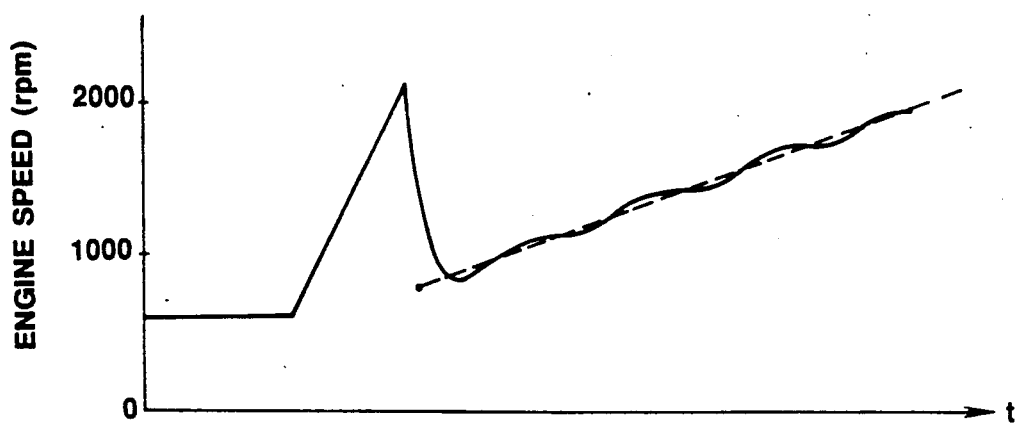
FIG. 12 is a chart showing variation of engine speed upon occurrence of wheel slip on a driving wheel.

The operation of the slip suppressive engine control will be further discussed with reference to timing charts in FIGS. 11 and 12. Assuming wheel slip occurs at a time $t_0$ in FIG. 11, the wheel speed $Vw_1$ (shown by solid line) of the driving wheel is abruptly accelerated to become much higher than the wheel speed $Vw_2$ (shown by broken line) of the driven wheel. This is caused by reduction of the load at the driving wheel. Namely, since the engine is connected to the driving wheel via a power train including the power transmission, reduction of the load on the driving wheel causes acceleration of the engine to increase the engine speed N, as shown in FIG. 12. Further assuming the wheel slippage λ increases across the wheel slippage threshold $\lambda_{ref}$ at a time $t_1$, fuel injection control mode is switched from normal mode to slip control mode, at the time $t_1$. In the slip control mode operation, the target engine speed $N_{cut}$ is set as illustrated by a broken line in FIG. 12. As can be seen, the target engine speed $N_{cut}$ is increased linearly. Therefore, the actual engine speed N is increased according to the increasing of variation of the target engine speed $N_{cut}$. Because the actual engine speed can be controlled to maintain the optimal wheel slippage hunting of the switching of control mode can be successfully prevented.

In addition, by varying the setting of the fuel cut-off cycle depending upon the catalytic converter temperature, overheating of the catalytic converter can be successfully prevented. This maintains effective operation of the catalytic converter.

Figure 13:
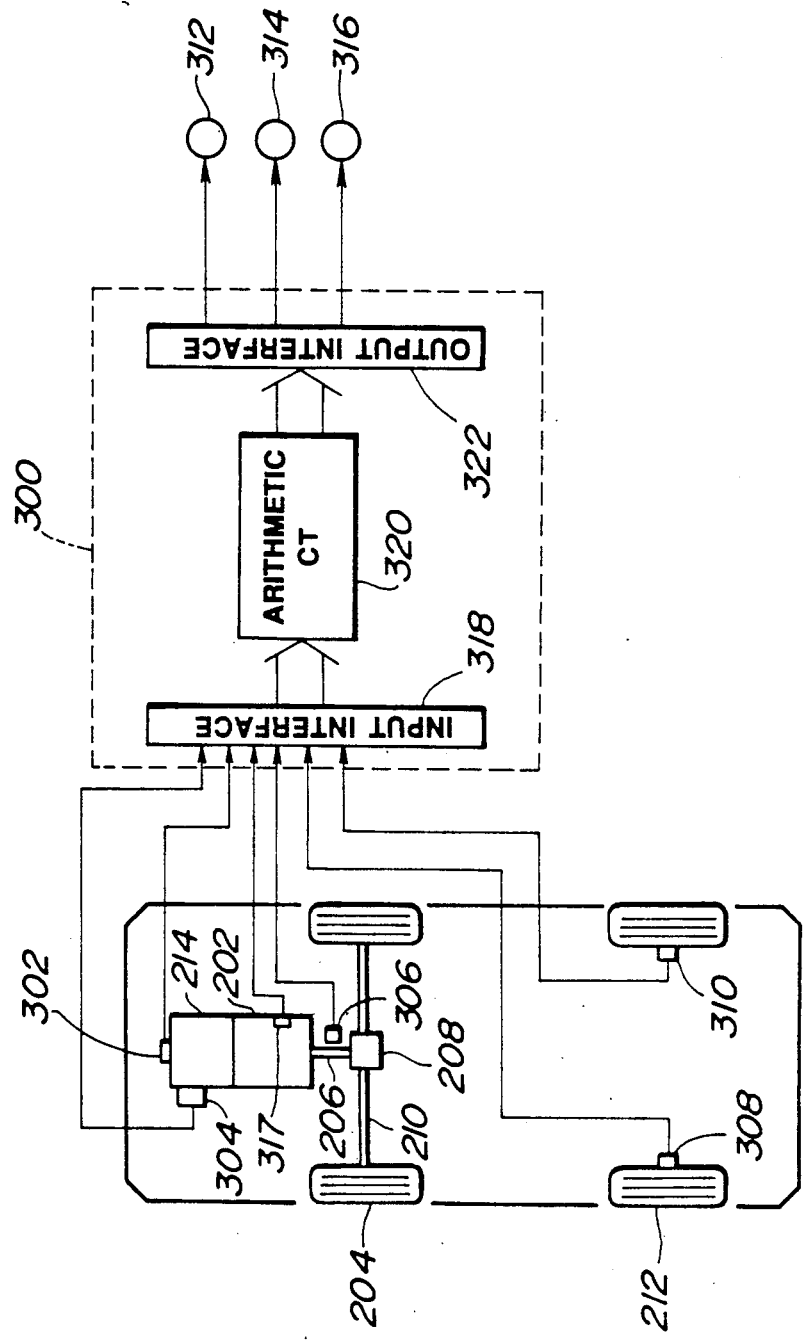
FIG. 13 is a block diagram of another embodiment of slip suppressive drive control system, according to the present invention.

FIG. 13 shows another embodiment of the slip suppressive drive control system, according to the present invention. The embodiment shown of the slip suppressive drive control system is applied to an automotive vehicle which utilizes a stepless automatic power transmission 202 to transmit engine output to driving heels 204 via an output shaft 206 of the power transmission, a differential gear unit 208 and drive shafts 210 As seen from FIG. 13, the embodiment shown is directed to an automotive vehicle which has a front engine, front wheel drive la? out. Therefore, the driving wheels 204 are front wheels in the embodiment shown. The rear wheels 212 are driven wheels which rotate freely according to vehicular travel. Therefore, the rotation speed of the driven wheels constantly reflects the vehicle speed.

An automotive internal combustion engine 214 is associated with the stepless automatic power transmission 202 for outputting the driving torque.

In order to perform control for controlling operations of the engine 214 and the transmission 202, a microprocessor based control unit 300 is provided. The control unit 300 is connected to a crank angle sensor 302 for receiving a crank reference signal or crank angle signal as an engine speed representative signal. The control unit 300 is also connected to an air flow meter 304, a driving wheel speed sensor 306 and driven wheel speed sensors 308 and 310. On the other hand, the control unit 300 s connected to a gear shift actuator 312 associated with the stepless automatic power transmission 202 for adjusting the transmission gear ratio. The control unit 300 is also connected to fuel injection valves 314 and an ignition coil 316. In addition, the control unit 300 is connected to a transmission neutral range switch 317 which is associated with a transmission selector lever (not shown) and designed to be turned ON when the selector lever is shifted into a neutral range position.

As schematically illustrated, the control unit 300 includes an input interface 318, an arithmetic circuit 320 which may include CPU, RAM and ROM and so forth, and an output interface 322.

Operation of the embodiment shown of the slip suppressive drive control system will be discussed herebelow with reference to FIG. 14. It should be appreciated that the routine shown is directed for transmission gear ratio selection control in relation to [lip suppressive engine output control. In the embodiment shown, the engine control for suppressing wheel slip is performed according to the process set forth with respect to the former embodiment. Therefore, in order to avoid redundant discussion and thus avoid confusion, the following discussion with respect to the second embodiment will concentrated on the transmission shift control in relation to slip suppressive engine control and neglect detailed discussion about the engine speed control.

Figure 14:
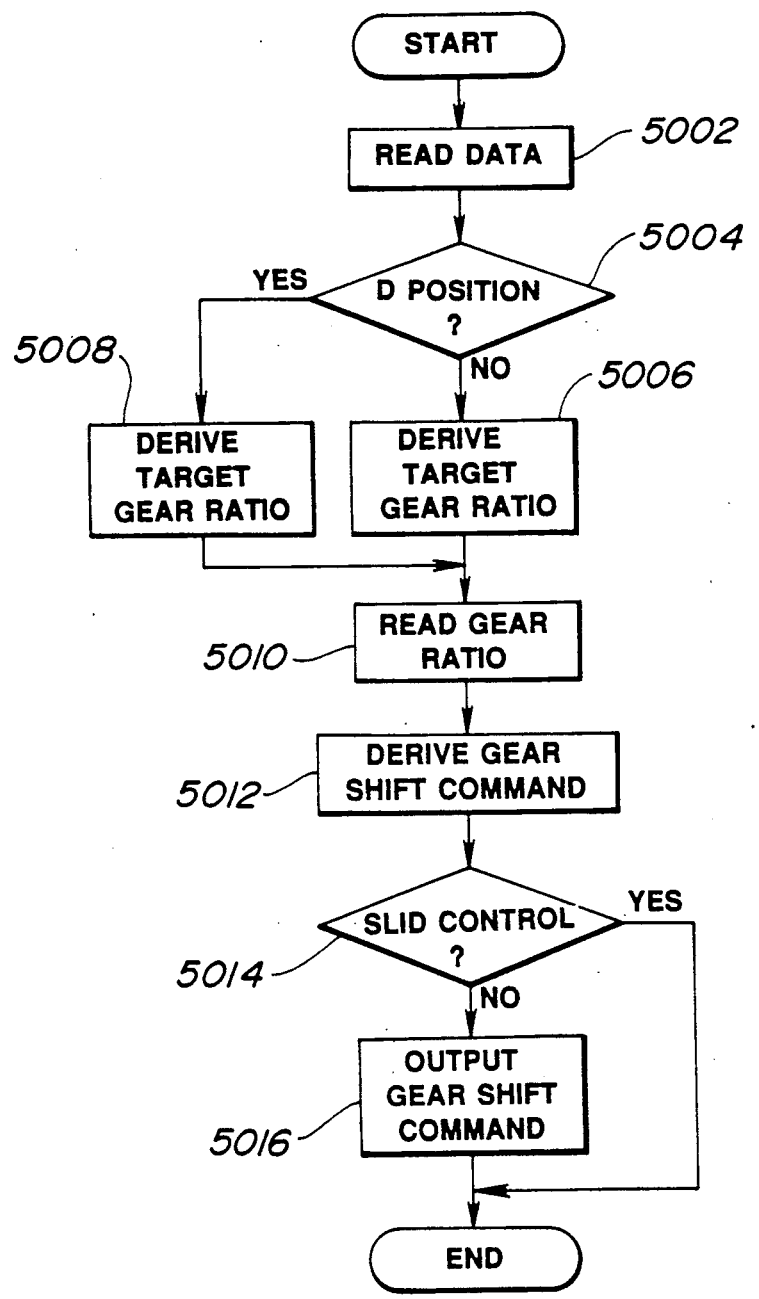
FIG. 14 is flowchart of a transmission shift control routine in the second embodiment of the slip suppressive drive control system of FIG. 13.

In the operation shown in FIG. 14, selected transmission control parameters, such as engine speed data N, the driving wheel speed indicative $Vw_1$, the driven wheel speed indicative data $Vw_2$ and so forth, are read out at a step 5002. At a step 5004, the transmission neutral position switch signal is checked to determine whether the transmission is in the drive position (D position) or neutral position (N position).

When the transmission selector position as checked at the step 5004 is the N position, the target transmission gear ratio in the N position, is derived at a step 5(06. On the other hand, when the transmission selector position is in the D position as checked at the step 5004, the target transmission gear ratio in the D position is derived at a step 5(08. Then, the actual transmission gear ratio is derived at a step 5010. Based on the target transmission gear ratio and the actual transmission gear ratio, a gear shift command is derived for adjusting the transmission gear ratio toward the target gear ratio, at a step 5012.

After deriving the gear shift command at the step 5012, the fuel cut mode representative flags $FL_{cut1}$ and/or $FL_{cut2}$ are checked at a step 5014. When the fuel cut mode representative flag as checked at the step 5014 is not set, the gear shift command is output at a step 5016. On the other hand, when the fuel cut mode representative flag is set as checked at the step 5014, the process jumps he step 5016 and directly goes to END. Therefore, while the slip control mode operation is performed according to the press illustrated in FIGS. 3 to 6, the gear shift command is not output so that the transmission gear ratio is fixed.

The process and parameters for deriving the target transmission gear ratio, actual transmission gear ratio, and gear shift command for feedback controlling the transmission gear ratio to the target transmission gear ratio have been disclosed in the U.S. Pat. No. 4,597,308, issued on July 1, 1986. The U. S. Patent identified above has been assigned to the common assignee of the present invention. The disclosures of this U. S. Patent will be herein incorporated by reference for the sake of disclosure.

Figure 15:
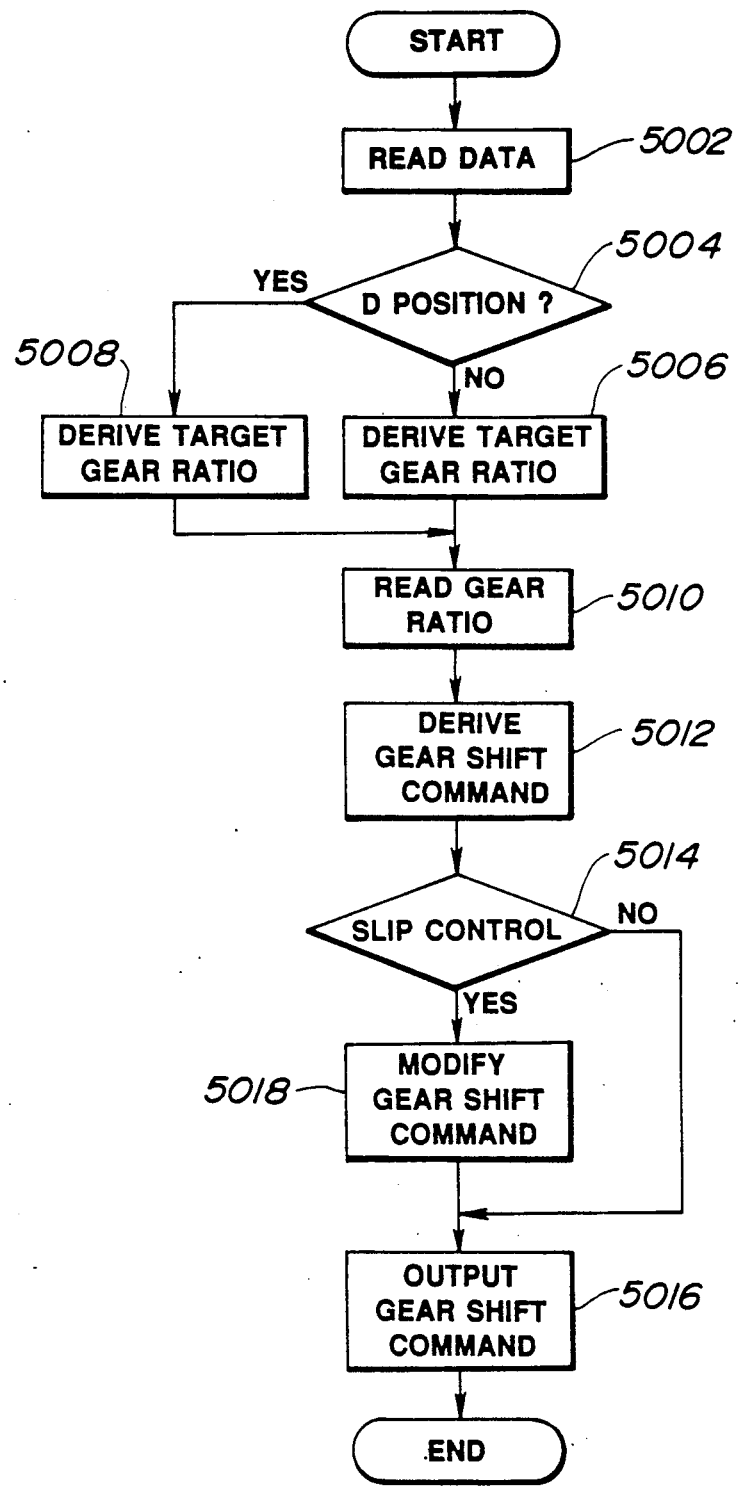
FIG. 15 is flowchart of a modified transmission shift control routine in the second embodiment of the slip suppressive drive control system of FIG. 13.

FIG. 15 shows modified transmission control routine to be performed for slip suppressive drive control. In this modified routine, a gear shift command derived at the step 5012 is modified when the slip control mode control operation for the engine is performed.

Therefore, when the fuel cut mode representative flag is not set as checked at the step 5014, the gear shift command derived at the step 5012 is output at the step 5016. On the other hand, when the fuel cut mode representative flag is set as checked at the step 5014, the gear shift command value is modified at a step 5018. The process of modifying the gear shift command value at the step 5018 will be discussed herebelow with reference to FIG. 16.

Figure 16:
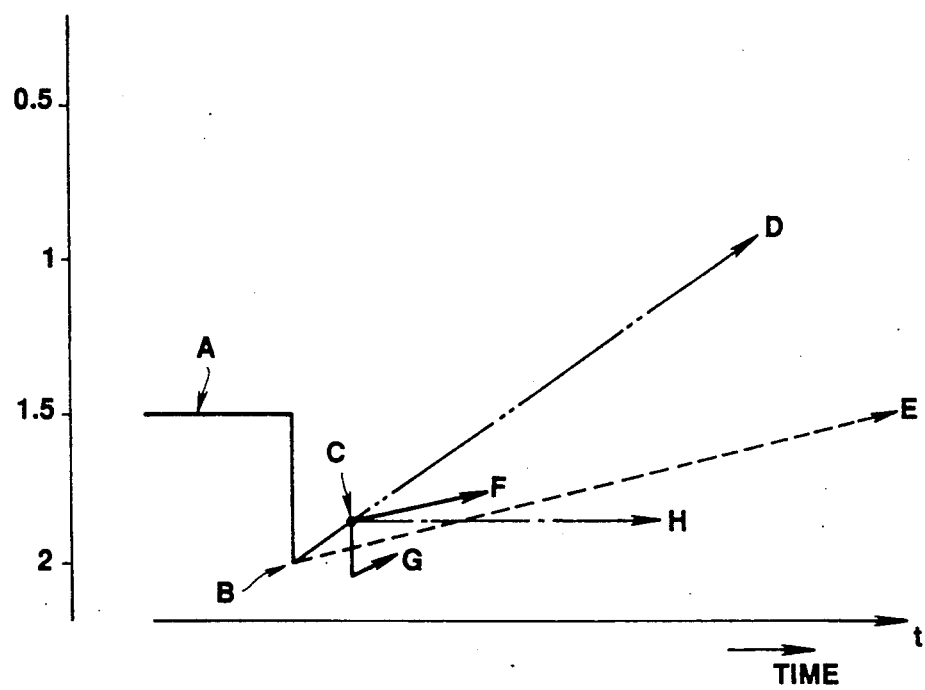
FIG. 16 is a chart showing a schedule of variation of the transmission gear ratio.

FIG. 16 shows gear shift pattern for the stepless automatic power transmission. In the normal driving condition, the transmission gear ratio command orders stepping down of the gear ratio from the gear ratio A to the gear ratio B in response to abrupt acceleration demand which is detected by abrupt change of throttle valve open angle or by abrupt increase of the air flow rate. According to stepping down ordering transmission gear ratio command, the actual gear ratio in the transmission is shifted. Thereafter, the gear ratio is gradually shifted toward the higher gear ratio according to increasing of the vehicle speed along line E in FIG. 16.

When wheel slippage occurs at the gear ratio C, the engine speed increases abruptly. This causes a higher rate gear shifting as shown by line D in FIG. 16 If such higher rate gear ratio shifting is allowed, the effect of fuel cut-off for decelerating the driving wheel speed becomes smaller. Therefore, the in the preferred process gear ratio shifting is modified to vary along the arrow F On the other hand, in the case of the process of FIG. 14, the transmission gear ratio is fixed at the ratio at the occurrence of the wheel slip as illustrated by line H. Therefore, in either case, the transmission gear ratio can be maintained low enough to make fuel cut-off effective for decelerating the wheel speed and thus recover wheel traction.

While the present invention have been disclosed in terms of the specific embodiments the invention can be implemented in various embodiments other than that illustrated hereabove. These embodiments implementing the invention should be appreciated to be involved with the scope of the invention, the principle of which is set out in the appended claims.

For example, it may be beneficial to introduce hysteresis technologies in setting the target engine speed to differentiate the values for switching from normal mode to slip control mode and from slip control mode to normal mode. On the other hand, though the shown embodiment of FIG. 13 is applied for the stepless automatic power transmission, it is, of course, possible to apply the same shift control technology to ordinary fixed gear ratio type power transmissions.

What is claimed is:

1. A slip control system for an automotive vehicle, comprising:
   first sensor means for monitoring engine revolution speed to produce engine speed indicative data;
   second sensor means for monitoring rotation speed of a driving wheel, which is driven by an output of an automotive internal combustion engine, and producing driving wheel speed representative data;
   third sensor means for monitoring vehicle speed to produce vehicle speed representative data;
   fourth means for detecting wheel slippage greater than a predetermined wheel slippage threshold on the basis of said driving wheel speed representative data; and said vehicle speed representative data; and
   fifth means for controlling said engine revolution speed based on preselected engine control parameters, said fifth means being responsive to said fourth means detecting said driving wheel speed representative data and said vehicle speed representative data for initiating a slip control mode operation in which a target engine speed achieving a predetermined allowable wheel slippage is derived on the basis of said engine speed data and is variable depending upon a ratio of said driving wheel speed representative data versus said vehicle speed representative data, and said engine revolution speed is controlled toward said target engine speed.

2. A slip control system as set forth in claim 1, wherein said third sensor means monitors rotation speed of a driven wheel for producing said vehicle speed representative data.

3. A slip control system as set forth in claim 2, wherein said fourth means derives said wheel slippage based on a difference between driving wheel speed and driven wheel speed.

4. A slip control system as set forth in claim 1, wherein said fifth means adjusts a fuel cut period in which fuel cut-off is performed, versus a fuel supply period in which fuel is supplied depending upon a difference between said engine speed data and said target engine speed.

5. A slip control system as set forth in claim 1, wherein said fifth means is operative in said slip control mode in a first mode to perform fuel cut-off for a limited number of engine cylinders and in a second mode to perform fuel cut-off for all engine cylinders, sand fifth means selects one of said first and second modes depending upon a difference between said engine speed data and said target engine speed.

6. A slip control system as set forth in claim 5, wherein said fifth means further adjusts a fuel cut period in which fuel cut-off is performed, versus a fuel supply period in which fuel is supplied depending upon a difference between said engine speed data and said target engine speed.

7. A slip control system as set forth in claim 6, wherein said fifth means compares said difference with a first criterion to select said second mode when said difference is greater than said first criterion and otherwise to select said first mode.

8. A slip control system as set forth in claim 7, wherein said fifth means compares said difference with a second criterion which is smaller than said first criterion, to set said fuel cut period at a longer first period when said difference is greater than said second criterion and otherwise set said fuel cut period at a shorter second period.

9. A slip control system as set forth in claim 1, wherein said fifth means derives a ratio of fuel cut period versus fuel supply period in a predetermined fuel cut-off control cycle period.

10. A slip control system as set forth in claim 1, which further comprises seventh means for controlling gear shifting to a power transmission, said seventh means being responsive to said fifth means operating in said slip control mode to fix a gear position t a gear ratio at which wheel slippage greater than said wheel slippage threshold is detected.

11. A slip control system as set forth in claim 1, which further comprises seventh means for controlling gear shifting of a power transmission, said seventh means being responsive to said fifth means operating in said slip control mode to cause delay in gear shifting from a gear ratio at which wheel slippage greater than said wheel slippage threshold is detected to a desired gear ratio determined based on preselected transmission control parameters.

12. A slip control system for an automotive vehicle, comprising:
first sensor means for monitoring engine revolution speed to produce engine speed indicative data;
second sensor means for monitoring rotation speed of a driving wheel, which is driven by an output of an automotive internal combustion engine, and producing driving wheel speed representative data;
third sensor means for monitoring vehicle speed to produce vehicle speed representative data;
fourth means for detecting wheel slippage greater than a predetermined wheel slippage threshold on the basis of said driving wheel speed representative data and said vehicle speed representative data;
fifth means for controlling said engine revolution speed based on preselected engine control parameters, said fifth means being responsive to said fourth means detecting said driving wheel speed representative data and said vehicle speed representative data for initiating a slip control mode operation in which a target engine speed achieving a predetermined allowable wheel slippage is derived on the basis of said engine speed data, said driving wheel speed representative data and said vehicle speed representative data and said engine revolution speed is controlled toward said target engine speed, said fifth means deriving a ratio of fuel cut period versus fuel supply period in a predetermined fuel cut-off control cycle period; and
fourth sensor means for monitoring a catalytic converter temperature to produce a catalytic converter temperature indicative signal, and said fifth means adjusts said fuel cut-off control cycle period depending upon a value of said catalytic converter temperature indicative signal.

13. A slip control system as set forth in claim 12, wherein said fifth means adjusts said fuel cut period in which fuel cut-off is performed, versus said fuel supply period in which fuel is supplied depending upon a difference between said engine speed data and said target engine speed, within said fuel cut-off control cycle period.

14. A slip control system as set forth in claim 13, wherein said fifth means is operative in said slip control mode in a first mode to perform fuel cut-off for a limited number of engine cylinders and in a second mode to perform fuel cut-off for all engine cylinders, said fifth means selects one of said first and second modes depending upon a difference between said engine speed data and the said target engine speed.

15. A slip control system as set forth in claim 14, wherein said fifth means further adjusts a fuel cut period in which fuel cut-off is performed, versus a fuel supply period in which fuel is supplied depending upon a difference between said engine speed data and said target engine speed.

16. A slip control system as set forth in claim 15, wherein said fifth means compares said difference with a first criterion to select said second mode when said difference is greater than said first criterion and otherwise to select said first mode.

17. A slip control system as set forth in claim 16, wherein said fifth means compares said difference with a second criterion to set said fuel cut period at a longer first period when said difference is greater than a second criterion and otherwise to set said fuel cut period at a shorter second period.

18. A slip control system as set forth in claim 17, wherein said second criterion is set at a smaller valve than said first criterion.

19. A slip control system as set forth in claim 17, wherein said fifth means compares said catalytic converter indicative signal value with a catalytic converter temperature criterion to set said fuel cut-off control period, said first period and said second period at predetermined smaller values when said catalytic converter temperature indicative signal value is smaller than said catalytic converter temperature criterion, and otherwise to set said periods at longer values.

20. A slip control system for an automotive vehicle, comprising:
first sensor means for monitoring an engine revolution speed to produce engine speed indicative data;
second sensor means for monitoring rotation speed of a driving wheel which is driven by an output of an automotive internal combustion engine, and producing driving wheel speed representative data;
third sensor means for monitoring vehicle speed to produce vehicle speed representative data;
fourth sensor means for monitoring catalytic converter temperature to produce catalytic converter temperature representative data;
fifth means for detecting wheel slippage greater than a predetermined wheel slippage threshold on the basis of said driving wheel speed representative data and said vehicle speed representative data; and
sixth means for controlling said engine revolution speed based on preselected engine control parameters, said sixth means being responsive to said fifth means detecting said driving wheel speed representative data and said vehicle speed representative data for initiating a slip control mode operation in which said sixth means periodically performs fuel cut-off in slip control mode operation for adjusting said engine revolution speed to a target engine speed, said sixth means adjusting a fuel cut period in which fuel cut-off is performed, depending upon said catalytic converter representative data.

21. A slip control system as set forth in claim 20 wherein said sixth means derives a ratio of said fuel cut period versus said fuel supply period in a predetermined fuel cut-off control cycle period.

22. A slip control system as set forth in claim 21, wherein said sixth means adjusts a fuel cut period in which fuel cut-off is performed, versus fuel supply period in which fuel is supplied depending upon a difference between said engine speed data and said target engine speed, within said fuel cut-off control cycle period.

23. A slip control system as set forth in claim 22, wherein said sixth means is operative in said slip control mode in a first mode to perform fuel cut-off for a limited number of engine cylinders and in a second mode to perform fuel cut-off for all engine cylinders, said sixth means selects one of said first and second modes depending upon a difference between said engine speed data and said target engine speed.

24. A slip control system as set forth in claim 23, wherein said sixth means further adjusts a fuel cut period in which fuel cut-off is performed, versus a fuel supply period in which fuel is supplied depending upon a difference between said engine speed data and said target engine speed.

25. A slip control system as set forth in claim 24, wherein said sixth means compares said difference with a first criterion to select said second mode when said difference is greater than said first criterion and otherwise select said first mode.

26. A slip control system as set forth in claim 25, wherein said sixth means compares said difference with a second criterion to set said fuel cut period at a longer first period when said difference is greater than a second criterion and otherwise set said fuel cut period at a shorter second period.

27. A slip control system as set forth in claim 26, wherein said second criterion is set at a smaller value than said first criterion.

28. A slip control system as set forth in claim 27, wherein said sixth means compares said catalytic converter indicative signal value with a catalytic converter temperature criterion to set said fuel cut-off control period, said first period and said second period at a predetermined smaller values when said catalytic converter temperature indicative signal value is smaller than said catalytic converter temperature criterion, and otherwise to set said periods at longer values.

29. A slip control system for an automotive vehicle, comprising:
first sensor means for monitoring an engine revolution speed to produce an engine speed indicative data;
second sensor means for monitoring rotation speed of a driving wheel which is driven by an output of an automotive internal combustion engine, and producing driving wheel speed representative data;
third sensor means for monitoring vehicle speed to produce vehicle speed representative data;
fourth means for detecting wheel slippage greater than a predetermined wheel slippage threshold on the basis of said driving wheel speed representative data and said vehicle speed representative data;
fifth means for controlling said engine revolution speed based on preselected engine control parameters, said fifth means being responsive to said fourth means detecting said driving wheel speed representative data and said vehicle speed representative data for initiating a slip control mode operation in which a target engine speed achieving a predetermined allowable wheel slippage is derived on the basis of said engine speed data, said driving wheel speed representative data and said vehicle speed representative data and said engine revolution speed is controlled toward said target engine speed; and
sixth means for controlling gear shifting of a power transmission, said sixth means being responsive to said fifth means operating in said slip control mode to fix a gear position at a gear ratio at which wheel slippage greater than said wheel slippage threshold is detected.

30. A slip control system as set forth in claim 29, wherein fifth means controls fuel supply for said engine for controlling said engine revolution speed, said fifth means controls fuel supply in said slip control mode operation to adjust said engine revolution speed toward said target engine speed.

31. A slip control system as set forth in claim 30, wherein said fifth means periodically performs fuel cut-off in slip control mode operation for adjusting said engine revolution speed to said target engine speed.

32. A slip control system as set forth in claim 31, wherein said fifth means adjusts a fuel cut period in which fuel cut-off is performed, versus a fuel supply period in which fuel is supplied depending upon a difference between said engine speed data and said target engine speed.

33. A slip control system as set forth in claim 31, wherein said fifth means derives a ratio of said fuel cut period versus said fuel supply period in a predetermined fuel cut-off control cycle period.

34. A slip control system as set forth in claim 31, wherein said fifth means is operative in said slip control mode in a first mode to perform fuel cut-off for a limited number of engine cylinders and in a second mode to perform fuel cut-off for all engine cylinders, said fifth means selects one of said first and second modes depending upon a difference between said engine speed data and said target engine speed.

35. A slip control system as set forth in claim 34, wherein said fifth means further adjusts a fuel cut period in which fuel cut-off is performed, versus a fuel supply period in which fuel is supplied depending upon a difference between said engine speed data and said target engine speed.

36. A slip control system as set forth in claim 35, wherein said fifth means compares said difference with a first criterion to select said second mode when said difference is greater than said first criterion and otherwise to select said first mode.

37. A slip control system as set forth in claim 36, wherein said fifth means compares said difference with a second criterion to set said fuel cut period at a longer first period when said difference is greater than a second criterion and otherwise set said fuel cut period at a shorter second period.

38. A slip control system as set forth in claim 37, wherein said second criterion is set at a smaller value than said first criterion.

39. A slip control system as set forth in claim 29, wherein said third sensor means monitors rotation speed of a driven wheel for producing said vehicle speed representative data.

40. A slip control system as set forth in claim 39, wherein said fourth means derives said wheel slippage based on a difference between driving wheel speed and driven wheel speed.

41. A slip control system for an automotive vehicle, comprising:

first sensor means for monitoring an engine revolution speed to produce engine speed indicative data;
second sensor means for monitoring rotation speed of a driving wheel which is driven by an output of an automotive internal combustion engine, and producing driving wheel speed representative data;
third sensor means for monitoring vehicle speed to produce vehicle speed representative data;
fourth means for detecting wheel slippage greater than a predetermined wheel slippage threshold on the basis of said driving wheel speed representative data and said vehicle speed representative data;
fifth means for controlling said engine revolution speed based on preselected engine control parameters, said fifth means being responsive to said fourth means detecting said driving wheel speed representative data and said vehicle speed representative data for initiating a slip control mode operation in which a target engine speed achieving a predetermined allowable wheel slippage is derived on the basis of said engine speed data, said driving wheel speed representative data and said vehicle speed representative data and said engine revolution speed is controlled toward said target engine speed; and
sixth means for controlling gear shifting of a power transmission, said sixth means being responsive to said fifth means operating in said slip control mode to cause delay in gear shifting from a gear ratio at which wheel slippage greater than said wheel slippage threshold is detected to a desired gear ratio determined based on preselected transmission control parameters.

42. A slip control system for an automotive vehicle, comprising:
first sensor means for monitoring an engine revolution speed to produce engine speed indicative data;
second sensor means for monitoring rotation speed of a driving wheel which is driven by an output of an automotive internal combustion engine, and producing driving wheel speed representative data;
third sensor means for monitoring vehicle speed to produce vehicle speed representative data;
fourth means for detecting wheel slippage greater than a predetermined wheel slippage threshold on the basis of said driving wheel speed representative data and said vehicle speed representative data;
fifth means for controlling engine operation, which is responsive to said engine speed indicative data and to said fourth means detecting said wheel slippage greater than said wheel slippage threshold to adjust said engine operation for adjusting engine output; and
sixth means for controlling gear shifting of a power transmission, said sixth means being responsive to said fifth means operating in said slip control mode to fix a gear position at a gear ratio at which wheel slippage greater than said wheel slippage threshold is detected.

43. A slip control system for an automotive vehicle, comprising:
first sensor means for monitoring an engine revolution speed to produce engine speed indicative data;
second sensor means for monitoring rotation speed of a driving wheel which is driven by an output of an automotive internal combustion engine, and producing driving wheel speed representative data; p1 third sensor means for monitoring vehicle speed to produce vehicle speed representative data;
fourth means for detecting wheel slippage greater than a predetermined wheel slippage threshold on the basis of said driving wheel speed representative data and said vehicle speed representative data;
fifth means for controlling engine operation, which is responsive to said engine speed indicative data and to said fourth means detecting wheel slippage greater than said wheel slippage threshold to adjust said engine operation for adjusting engine output; and
sixth means for controlling gear shifting of a power transmission, said sixth means being responsive to said fifth means operating in said slip control mode to cause delay in gear shifting from a gear ratio at which wheel slippage greater than said wheel slippage threshold is detected to a desired gear ratio determined based on preselected transmission control parameters.

44. A slip control system for an automotive vehicle, comprising:
first sensor means for monitoring an engine revolution speed to produce engine speed indicative data;
second sensor means for monitoring rotation speed of a driving wheel which is driven by an output of an automotive internal combustion engine, and producing driving wheel speed representative data;
third sensor means for monitoring vehicle speed to produce vehicle speed representative data;
fourth means for detecting wheel slippage greater than a predetermined wheel slippage threshold on the basis of said driving wheel speed representative data and said vehicle speed representative data;
a fuel delivery control system for controlling delivery of fuel to said engine; and
fifth means for controlling said engine revolution speed based on preselected engine control parameters, said fifth means being responsive to said fourth means detecting said driving wheel speed representative data and said vehicle speed representative data for satisfying a predetermined wheel slip condition for initiating a slip control mode operation in which a target engine speed achieving a predetermined allowable wheel slippage is derived on the basis of said engine speed data, said driving wheel speed representative data and said vehicle speed representative data and said engine revolution speed is controlled toward said target engine speed, in said slip control mode operation, said fifth means initiating at least partial fuel cut-off for reducing said engine revolution speed toward said target engine speed.

45. A slip control system for an automotive vehicle, comprising:
first sensor means for monitoring an engine revolution speed to produce engine speed indicative data;
second sensor means for monitoring rotation speed of a driving wheel which is driven by an output of an automotive internal combustion engine, and producing driving wheel speed representative data;
third sensor means for monitoring vehicle speed to produce vehicle speed representative data;
fourth means for detecting wheel slippage greater than a predetermined wheel slippage threshold on the basis of said driving wheel speed representative data and said vehicle speed representative data;

a fuel delivery control system for controlling delivery of fuel to said engine; and fifth means for controlling said engine revolution speed based on preselected engine control parameters, said fifth means being responsive to said fourth means detecting said driving wheel speed representative data and said vehicle speed representative data for satisfying a predetermined wheel slip condition for initiating a slip control mode operation in which a target engine speed achieving a predetermined allowable wheel slippage is derived on the basis of said engine speed data, said driving wheel speed representative data and said vehicle speed representative data and said engine rotation speed is controlled toward said target engine speed, said fifth means performing at least partial fuel cut-off for reducing said engine revolution speed while said engine revolution speed is maintained higher than said target engine speed.

46. A slip control system for an automotive vehicle, comprising:

first sensor means for monitoring an engine revolution speed to produce engine speed indicative data;

second sensor means for monitoring rotation speed of a driving wheel which is driven by an output of an automotive internal combustion engine, and producing driving wheel speed representative data;

third sensor means for monitoring vehicle speed to produce vehicle speed representative data;

fourth means for detecting wheel slippage greater than a predetermined wheel slippage threshold on the basis of said driving wheel speed representative data and said vehicle speed representative data;

a fuel delivery control system for controlling delivery of fuel to said engine; and fifth means for controlling said engine revolution speed based on preselected engine control parameters, said fifth means being responsive to said fourth means detecting said driving wheel speed representative data and said vehicle speed representative data for satisfying a predetermined wheel slip condition for initiating a slip control mode operation in which a target engine speed serving as a fuel cut-off criterion is derived on the basis of said engine speed data, said driving wheel speed representative data and said vehicle speed representative data and the engine revolution speed is controlled toward said target engine speed, said fifth means periodically performing at least partial fuel cut-off for reducing said engine revolution speed while said engine revolution speed is maintained higher than said target engine speed.

* * * * *